United States Patent
Gall et al.

(10) Patent No.: US 11,306,805 B2
(45) Date of Patent: Apr. 19, 2022

(54) CONTOURED DIFFERENTIAL GEAR WASHER WITH DEFINED FLUID FLOW PATH

(71) Applicant: GKN Automotive Limited, Worcestershire (GB)

(72) Inventors: David E. Gall, Clarkston, MI (US); Kevin J. Kaplan, Macomb, MI (US)

(73) Assignee: GKN Automotive Limited, Birmingham (GB)

( * ) Notice: Subject to any disclaimer, the term of this patent is extended or adjusted under 35 U.S.C. 154(b) by 28 days.

(21) Appl. No.: 16/667,992

(22) Filed: Oct. 30, 2019

(65) Prior Publication Data

US 2020/0063846 A1  Feb. 27, 2020

Related U.S. Application Data

(63) Continuation of application No. PCT/US2017/033231, filed on May 18, 2017.

(51) Int. Cl.
| | |
|---|---|
| *F16H 48/38* | (2012.01) |
| *F16B 43/00* | (2006.01) |
| *B60K 17/16* | (2006.01) |
| *B60K 17/346* | (2006.01) |
| *F16H 48/08* | (2006.01) |

(52) U.S. Cl.
CPC .......... *F16H 48/38* (2013.01); *B60K 17/165* (2013.01); *B60K 17/346* (2013.01); *F16B 43/00* (2013.01); *F16H 48/08* (2013.01); *F16H 2048/387* (2013.01)

(58) Field of Classification Search
CPC .... F16H 48/38; F16H 48/08; F16H 2048/387; B60K 17/165; B60K 17/346
See application file for complete search history.

(56) References Cited

U.S. PATENT DOCUMENTS

| | | | |
|---|---|---|---|
| 2,713,482 A | | 7/1955 | Stapleton |
| 4,084,450 A | * | 4/1978 | Conroy .................. F16H 48/08 475/160 |

(Continued)

FOREIGN PATENT DOCUMENTS

| | | |
|---|---|---|
| CN | 102644724 A | 8/2012 |
| CN | 203297593 U | 11/2013 |

(Continued)

OTHER PUBLICATIONS

Machine translation of FR3001271 filed Jan. 22, 2021 (Year: 2021).*

(Continued)

*Primary Examiner* — Tisha D Lewis
(74) *Attorney, Agent, or Firm* — Jennifer M. Brumbaugh; Reising Ethington P.C.

(57) ABSTRACT

A differential with a washer for a gear in a differential housing includes an outer edge at a maximum radial distance from an axis, and an inner edge defining an opening, the inner edge defined in part by an innermost portion at a minimum radial distance from the axis and the inner edge having an outward portion spaced radially outwardly from the innermost portion. The washer also includes an axially and radially inclined sidewall extending at least part of the way between the outer edge and the innermost portion.

19 Claims, 3 Drawing Sheets

(56) References Cited

U.S. PATENT DOCUMENTS

| | | | |
|---|---|---|---|
| 4,280,390 | A | 7/1981 | Murray |
| 4,480,492 | A | 11/1984 | Fujioka et al. |
| 4,776,237 | A | 10/1988 | Premiski et al. |
| 4,841,807 | A | 6/1989 | Merkler |
| 6,135,910 | A | 10/2000 | Urmaza et al. |
| 7,189,183 | B2 | 3/2007 | Fugel et al. |
| 7,223,192 | B2 | 5/2007 | Kashiwazaki |
| 7,686,727 | B2 | 3/2010 | Hammill |
| 9,951,850 | B2 | 4/2018 | Kramer et al. |
| 2005/0232525 | A1 | 10/2005 | Faust et al. |
| 2006/0287152 | A1 | 12/2006 | Bishop et al. |
| 2009/0215574 | A1 * | 8/2009 | Weber .................... F16H 57/08 475/230 |
| 2011/0113739 | A1 | 5/2011 | Scuffham et al. |
| 2011/0211933 | A1 | 9/2011 | Giraud et al. |

FOREIGN PATENT DOCUMENTS

| | | | | |
|---|---|---|---|---|
| CN | 106415063 | A | 2/2017 | |
| DE | 3502076 | C1 | 4/1986 | |
| DE | 19637120 | C1 | 1/1998 | |
| DE | 102004037867 | B4 | 9/2006 | |
| DE | 202011102802 | U1 | 12/2011 | |
| DE | 102013018548 | A1 | 5/2015 | |
| DE | 102014221408 | A1 * | 4/2016 | ............. F16H 48/08 |
| FR | 1128374 | A | 1/1957 | |
| FR | 2864189 | A1 | 6/2005 | |
| FR | 2879694 | A1 | 6/2006 | |
| FR | 3001271 | A1 * | 7/2014 | ............. F16H 48/38 |
| GB | 2086498 | A | 5/1982 | |
| JP | 58211054 | A * | 12/1983 | ............. F16H 48/08 |
| JP | 2001146952 | A * | 5/2001 | ............. F16H 48/08 |
| JP | 2009250320 | A | 10/2009 | |
| JP | 2012112516 | A | 6/2012 | |
| JP | 2018100705 | A * | 6/2018 | ............. F16H 57/04 |
| KR | 20090118446 | A * | 11/2009 | ............. F16H 48/08 |

OTHER PUBLICATIONS

EP Search Report for EP Application No. 17909851.2 dated Oct. 26, 2020 (9 pages).
Written Opinion & International Search Report for PCT/US2017/033231 dated Aug. 1, 2017, 9 pages.
JP Office Action for JP Application No. 2019-563870 dated Mar. 9, 2021 (9 pages).
CN Office Action for CN Application No. 201780090896.9 dated Jan. 26, 2021 (12 pages).
CN Office Action for CN Application No. 201780090896.9 dated Oct. 8, 2021 (10 pages).
JP Office Action for JP Application No. 2019-563870 dated Aug. 17, 2021 (5 pages).

\* cited by examiner

CONTOURED DIFFERENTIAL GEAR WASHER WITH DEFINED FLUID FLOW PATH

CROSS REFERENCE TO RELATED APPLICATIONS

This application is a continuation of PCT/US2017/033231 filed May 18, 2017, the entire contents of which are incorporated herein by reference in its entirety.

TECHNICAL FIELD

The present disclosure relates generally to washers such as may be used with gears in a vehicle differential.

BACKGROUND

In general, vehicles include drivelines that transmit torque from an engine to one or more wheels. Automotive drivelines are commonly equipped with a differential between sideshafts of a front axle, between sideshafts of a rear axle, or between both axles. Each axle typically includes a left sideshaft and a right sideshaft. Open differentials, in particular, allow a wheel on one sideshaft to spin faster or slower than a wheel on the other sideshaft. This occurs, for instance, when an automobile is turning a corner. Differentials also apportion driven torque between sideshafts. All-wheel drive (AWD) automotive drivelines can also be equipped with a differential between its front and rear axles to perform similar functions therebetween.

SUMMARY

In at least some implementations, a differential has a washer for a gear in a differential housing that includes an outer edge at a maximum radial distance from an axis, and an inner edge defining an opening, the inner edge defined in part by an innermost portion at a minimum radial distance from the axis and the inner edge having an outward portion spaced radially outwardly from the innermost portion. The washer also includes an axially and radially inclined sidewall extending at least part of the way between the outer edge and the innermost portion.

In at least some implementations, the innermost portion may include multiple segments that each have an inner surface that defines part of the innermost portion. The inner surfaces of the segments may be at a common radial distance from the axis. The innermost portion may comprise between 10% and 90% of the circumference of a circle bounded by the innermost portion. The outward portion may be defined by multiple voids, each void being defined between two segments. The outward portion may include a surface that is at least 0.5 mm radially outwardly spaced from the innermost portion. The voids may comprise between 10% and 90% of the circumference of a circle bounded by the innermost portion. And each void may be at least 1 mm in circumferential dimension at an imaginary circle bounded by the innermost portion.

In at least some implementations, the washer may also include a rim, and the sidewall may extend from a first end at the outer edge to a second end that is axially spaced from the outer edge, and the rim may extend from the second sidewall end to the inner edge. And the rim may be axially inclined so that the inner edge is axially between the first and second ends of the sidewall. The sidewall may be contoured such that the peripheral length of the first end is greater than the peripheral length of the second end.

At least some implementations of a washer for a gear in a differential housing may include a contoured sidewall having a first end and a second end. The first end has a first peripheral length relative to an axis of the washer, and the second end is axially offset from the first end and has a second circumferential length relative to the axis that is less than the first circumferential length. An inner edge defines an opening that is not circular, and the inner edge is defined in part by an innermost portion at a minimum radial distance from the axis and the inner edge has an outward portion spaced radially outwardly from the innermost portion. The innermost portion may be located radially inwardly of the sidewall and axially between the first end and second end of the sidewall.

BRIEF DESCRIPTION OF THE DRAWINGS

The following detailed description of preferred implementations and best mode will be set forth with regard to the accompanying drawings, in which.

DETAILED DESCRIPTION

Figure 1:
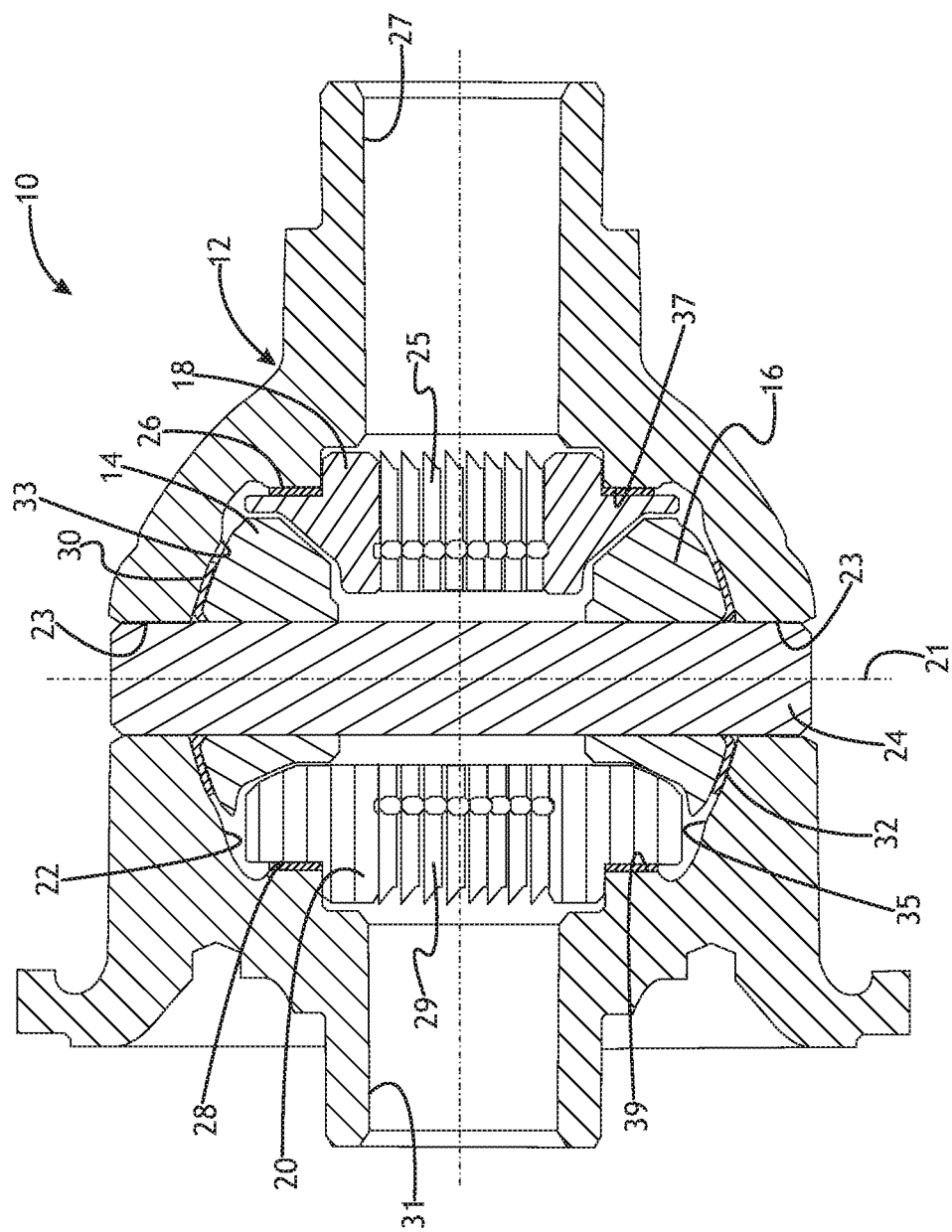
FIG. 1 is a sectional view of an embodiment of an automotive differential.

Referring in more detail to the drawings, an automotive differential 10 can be equipped in an automotive driveline for performing differential functionalities between sideshafts of a front axle, between sideshafts of a rear axle, or between front and rear axles. Spacers may be provided to move the gears within the differential along both a pinion gear axis and a side gear axis to shift the gears toward target gear positions in order to optimize gear mesh points between teeth of the differential gears. Manufacturing tolerances and other imperfections are hence accommodated, and noise, vibration, and harshness (NVH) issues otherwise encountered at higher-rotational-speed (e.g. in a disconnect mode where an associated axle is not actively driven) in the automotive differential 10 are minimized or eliminated.

In general, the automotive differential 10 can have different designs and constructions depending upon, among other possible influences, the architecture of the larger AWD automotive driveline, upstream and downstream driveline components, packaging requirements, and torque output demands; for instance, the automotive differential could have more than two pinion gears, and could have three or four or more pinion gears. In the embodiment presented in the figures, the automotive differential 10 is an open differential and includes a housing 12, a first pinion gear 14, a second pinion gear 16, a first side gear 18, and a second side gear 20; still, more, less, and/or different components can be included in other embodiments. The housing 12 can have an input gear such as a ring gear at its exterior that is engaged by an upstream output gear such as an output gear of a transmission in a front axle layout or that of a propeller shaft of the automotive driveline. When driven, the housing 12 rotates about an axis A. The housing 12 can have windows in its walls that expose sections of the gears 14, 16, 18, 20, and that provide entry for assembling and installing the gears within an interior 22 of the housing 12. In the interior 22, the housing 12 defines a cavity suited to receive the pinion gears 14, 16 and suited to receive the side gears 18, 20 therein.

The first and second pinion gears 14, 16 and first and second side gears 18, 20 interact with one another to carry out the automotive differential's functionalities. Each of the gears 14, 16, 18, 20 has teeth formed around its exterior. In this embodiment, in assembly and use of the automotive differential 10, the teeth of the first pinion gear 14 mesh with the teeth of the first and second side gears 18, 20, and similarly the teeth of the second pinion gear 16 mesh with the teeth of the first and second side gears 18, 20. The first and second pinion gears 14, 16 are mounted on a pinion shaft 24 that has a center axis 21 and is mounted in openings 23 in opposite sides of the differential housing. The first side gear 18 has a set of internal splines 25 for connection to a first sideshaft an end of which is received in an opening 27 of the housing 12, and the second side gear 20 has a set of internal splines 29 for connection to a second sideshaft an end of which is received in a generally oppositely facing opening 31 in the housing.

As illustrated in FIG. 1, a first pinion gear washer 30 is situated between a first interior wall 33 of the housing 12 and the first pinion gear 14, and a second pinion gear washer 32 is situated between a second interior wall 35 of the housing 12 and the second pinion gear 16. The first and second pinion gear washers 30, 32 can be a contoured, not planar washer such as a spherical disc washer. A first side gear washer 26, on the other hand, is situated between a third interior wall 37 of the housing 12 and the first side gear 18, and a second side gear washer 28 is situated between a fourth interior wall 39 of the housing 12 and the second side gear 20. The first and second side gear washers 26, 28 can be flat and planar, like a thrust washer, or can be another type of washer such as a Belleville washer or a spherical disc washer.

At least one of the washers 26, 28, 30, 32 may be contoured, which is to say, have a portion that is not flat or planar. The following description will refer to washer 30 and corresponding gear 14, but can apply to the other washers 26, 28, 32 and their corresponding gears. As shown in FIGS. 2-6, the washer 30 may include a body having a central axis 40 and a portion of the body (i.e. a sidewall) 42 that may be symmetrical relative to the central axis and which may be axially and radially inclined so that it is generally frusto-conically shaped. Hereafter, the term axial is used to denote the direction parallel to central axis 40, the term radial is used to denote the direction perpendicular to central axis 40 and the term circumferential is used to denote a direction or boundary extending around the axis. The sidewall 42 may extend from a first end 44 which may define an outer edge or periphery of the washer 30 to a second end 46 that leads to an inner edge 48 of the washer. The diameter of the sidewall 42 decreases along the axial length of the sidewall from the first end 44 to second end 46. The sidewall 42 may be linearly tapered or it may be non-linear. One example of a non-linear sidewall 42 is shown in FIGS. 2-6 wherein the sidewall is bowed along its axial length, in other words, somewhat curved or defining a portion of a sphere. In at least some implementations, the sidewall 42 may be of uniform radial thickness and the sidewall may be continuous, that is, without any voids or interruptions, and may be generally smooth (i.e. of constant diameter at a given axial height) although it may be wavy (with radial variations along the circumferential extent of the sidewall). Even if wavy or not of constant diameter at a given axial height, the sidewall 42 may be considered to define a diameter at the average radial distance of the sidewall at a given axial height. Also or instead, the sidewall 42 may have a peripheral length that, in general, decreases along the axial height of the sidewall from the first end 44 to second end 46 of the sidewall.

In at least some implementations, the sidewall 42 extends from the outer edge 44 of the washer to a second end 46 of the sidewall that is located closer (radially and axially) to the inner edge 48 of the washer 30 than the outer edge. The first and second ends 44, 46 of the sidewall 42 may define opposed axially outermost edges of the washer 30, wherein a maximum axial length of the washer exists between the first and second ends of the sidewall. Extending from the second sidewall end 46, the washer 30 may include a rim 50 that is axially inclined toward the outer edge 44 and extends radially inwardly from the second sidewall end 46 to the inner edge 48 of the washer. Hence, at least in such implementations, the axial length from the inner edge 48 to the outer edge 44 is less than the axial length from the outer edge 44 to the second sidewall end 46. The transition between the second sidewall end 46 and the inwardly angled rim 50 may be a sharp bend or a smooth radius of any desired dimension.

Figure 2:
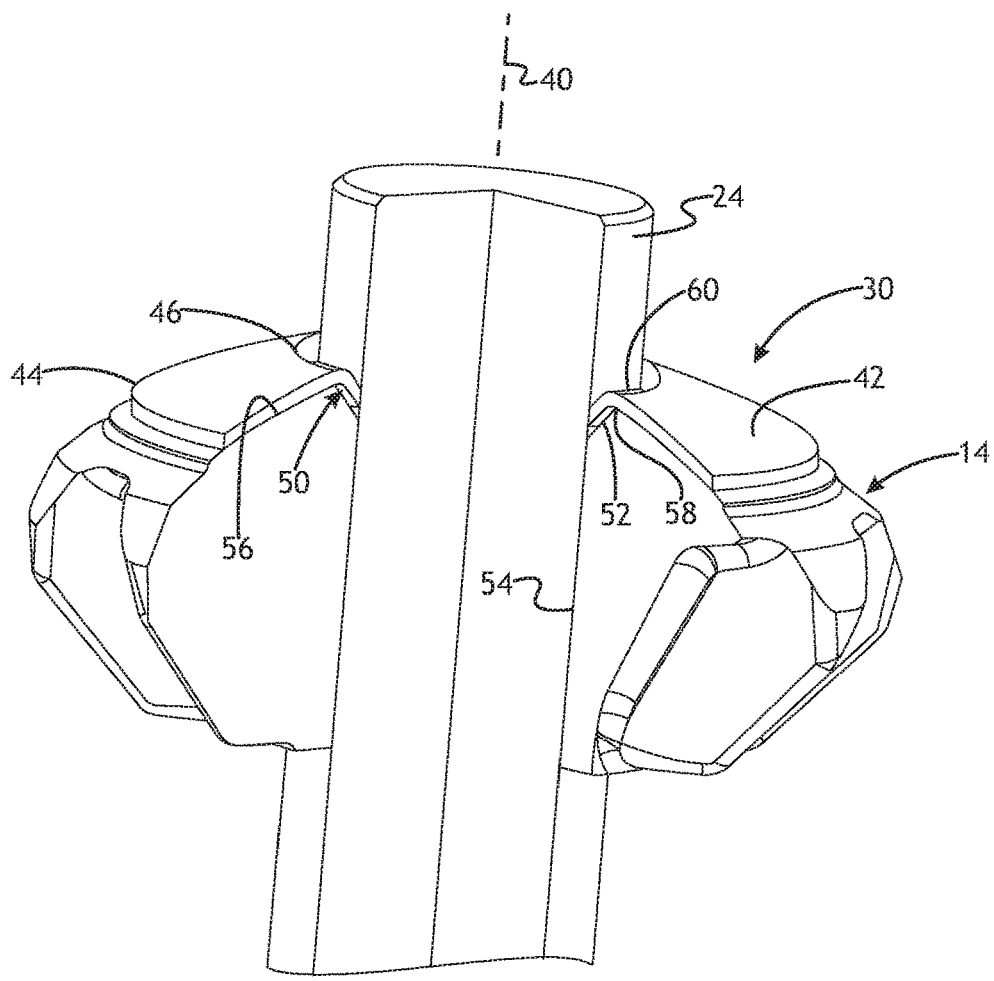
FIG. 2 is a sectional view of a pin, pinion gear and washer of the differential of FIG. 1.
Figure 3:
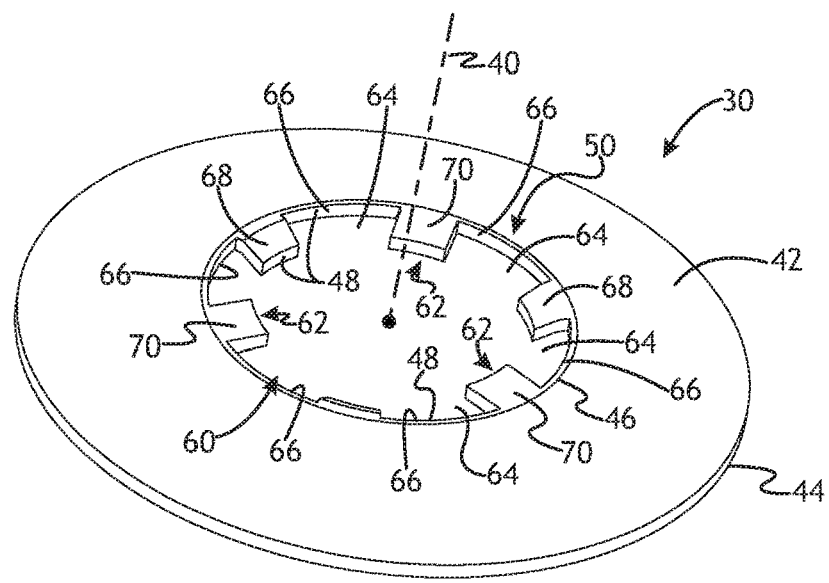
FIG. 3 is a perspective view of the washer.

As shown in FIG. 2, the rim 50 may be designed for receipt in or adjacent to an inwardly chamfered or beveled portion 52 of the gear (e.g. pinion gear 14) that leads to a central opening 54 in the gear 14 through which the pinion shaft 24 is received. Likewise, the sidewall 42 may be designed for receipt adjacent to a sloped outer surface 56 of the gear that is outboard of the beveled portion 52. The transition between the washer sidewall 42 and the rim 50 may overlie a transition edge or region 58 of the gear 14 that is between the outer surface 56 and beveled portion 52. The washer sidewall 42 may be complementary to the outer surface 56 of the gear, or it may be shaped differently to provide a gap between at least part of the sidewall 42 and the gear outer surface 56. A gap between the washer sidewall 42 and gear outer surface 56 may permit or facilitate some flexing of the washer 30 relative to the gear 14 and/or the housing 12, which may permit some movement of the gear relative to the housing. This may also provide a yieldable biasing force on the gear 14 urging the gear away from the housing 12 and toward the other gears meshed therewith. Further, the gap may facilitate lubrication flow between washer 30 and gear outer surface 56, thereby enhancing the overall durability of the system.

To permit the pinion shaft 24 to extend through the washer 30, an opening 60 is defined by the inner edge 48. The inner edge 48 may define a radially innermost portion 62 of the washer, which may be defined by one segment or multiple segments of the inner edge which may be circumferentially spaced apart. The innermost portion 62 of the washer 30 may be defined by a portion or portions of the inner edge 48 that is/are radially closest to the axis 40, and the innermost portion 62 may contact the outer surface of the shaft 24 to retain the position of the washer relative to the shaft and gear. In at least some implementations, the innermost portion 62 of the washer 30 is not circumferentially continuous. Instead, there are one or more circumferentially and radially extending gaps or voids 64 that define a portion of the opening 60 and inner edge 48 that is radially outwardly spaced from the innermost portion 62. Each void 64 has a surface that is radially outwardly spaced from the innermost portion, and defines an outward portion 66 of the inner edge 48. The outward portions 66 of the inner edge 48 are joined to the innermost portion 62 of the inner edge by connecting surfaces. Hence, due to the void(s) 64, the inner edge 48 is not at a constant radius and is instead radially varied and not circular. Additionally, the innermost portion 62 may be defined by straight line segments instead of radially oriented segments.

The void or voids 64 provide a defined fluid flow path between the washer 30 and the outer surface of the shaft 24. This flow path permits, for example, lubricant within the cavity 22 to flow between the shaft 24 and washer 30, and that lubricant may flow between the washer 30 and housing 12, and the washer 30 and gear 14. This lubricant flow may keep the gear 14 better lubricated and improve lubrication between the closely adjacent running surfaces of the housing 12, washer 30 and the gear 14. This can extend the useful life of the differential assembly 10 in general, and of each of these components. With a washer having an inner edge that is continuous, without any voids, the small clearance (if any) between the washer and outer surface of the shaft 24 would not permit such lubricant flow and lubrication within the differential is worse, especially in the areas with closely adjacent components such as the washer, housing and gear which are closely sandwiched together in use.

Figure 4:
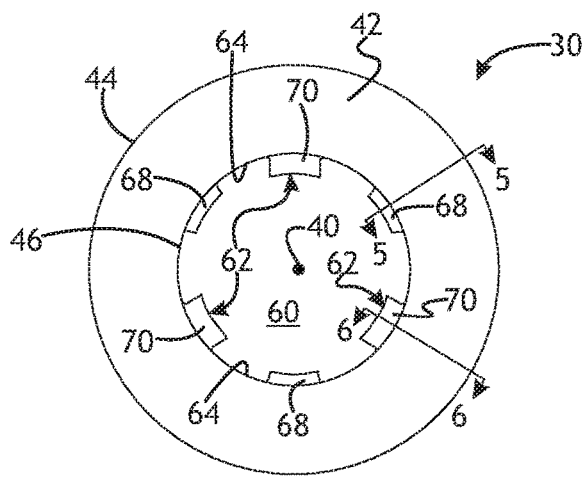
FIG. 4 is a plan view of the washer.
Figure 5:
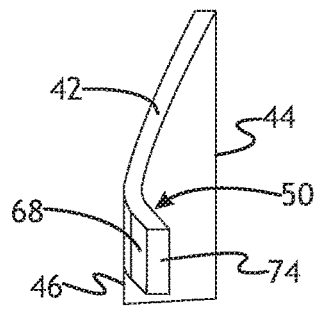
FIG. 5 is a fragmentary sectional view taken along line 5-5 in FIG. 4.
Figure 6:
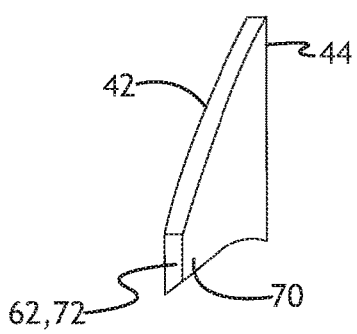
FIG. 6 is a fragmentary sectional view taken along line 6-6 in FIG. 4.

In the embodiment shown in FIGS. 4-6, the washer 30 includes a rim 50 defined in part or in total by segments or tabs that extend radially inwardly from the sidewall 42. In this example, there are six circumferentially spaced tabs 68, 70 and every other tab (moving around the circumference) is bent axially toward the pinion gear 14, as shown in FIG. 5, so that a free end 70 of these tabs 68 is axially overlapped by (but radially inwardly spaced from) the sidewall 42. These tabs 68 are arranged to overlie the beveled portion 52 of the gear 14. In this example, the other tabs 70 are not bent axially, as shown in FIG. 6, and instead continue from the sidewall 42 at the same general angle or shape as the sidewall. These tabs 70 may extend radially inwardly further than the bent tabs 68 and an inner surface 72 (FIG. 6) of these tabs 70 may define the innermost portion 62 of the washer 30 and bound an imaginary circle having a diameter of sufficient size to receive the shaft 24 between the inner surfaces 72 of these tabs. Of course, other arrangements may be used. For example, without limitation, none of the tabs 68 need to be bent, all of the tabs 68, 70 could be bent, fewer or more tabs could be bent, the bent and unbent tabs need not alternate or be evenly spaced apart, an inner surface 74 (FIG. 5) of the bent tabs 68 could be at the same radial distance as the inner surface 72 of the unbent tabs 70, and the tabs 68, 70 may be of the same or different radial and/or circumferential size.

Voids 64 exist between the innermost portion 62 of the washer 30 and one or more other portions 66 of the inner edge 48 of the washer. That is, the inner edge portion of these other portions 66 is radially outwardly spaced from the inner edge of the portions of the washer that define the innermost portion 62 of the washer 30 (in this example, the inner edge 72 of the unbent tabs 70). The tabs 68, 70 may define all or part of the rim 50. In at least some implementations, the inner edge 48, in the area of the outward portions 66, may be defined by the second end 46 of the sidewall 42 and the tabs 68, 70 extending therefrom may define the rim 50 at least part of which is inclined relative to the sidewall 42.

Figure 7:
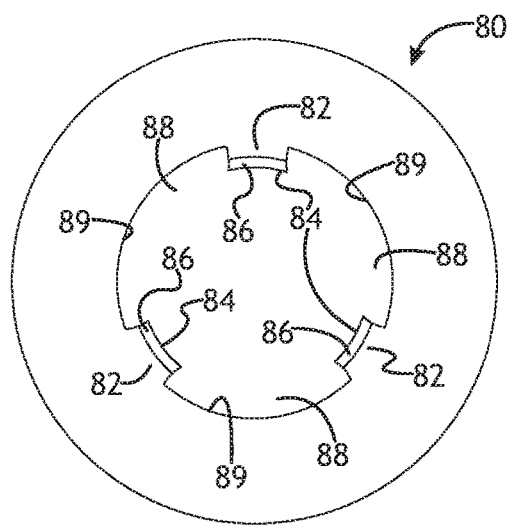
FIG. 7 is a bottom view of a washer.

In a washer 80 shown in FIG. 7, three tabs 82 extend radially inwardly so that an inner edge 84 of each defines the innermost portion of the washer 80 and, in assembly, are received immediately adjacent to or against the shaft 24. These tabs 82 are all shown as being bent inwardly so that their free ends or inner edges 84 are axially overlapped by but radially inwardly spaced from the sidewall 42. As shown, the tabs 82 have an end portion 86 that is bent to point axially, generally parallel to the axis and extending toward the outer edge 44 of the sidewall 42. Of course, arrangements other than that shown are possible. Voids 88 exist between the tabs 82 and define one or more outward portions of the inner edge of the washer 80. That is, the inner edge 89 of these other portions 88 is radially outwardly spaced from the inner edge of the portions of the washer 80 that define the innermost portion of the washer (in this example, the inner edge 84 of the tabs 82).

The particular embodiment shown in FIGS. 4-6 includes tabs 68, 70 having inner surfaces that are each less than 10% of the circumference of an imaginary circle bounded by the inner surfaces, and the voids 64 are shown as being similar (e.g. within 20%) in circumferential dimension at the imaginary circle. However, as noted above, the tabs 68, 70 and voids 64 can be of other sizes and shapes. In FIG. 7, the tab inner edges 84 are similar to that shown in FIG. 4, but the voids 88 are much larger circumferentially as there are only three tabs 82 in the example of FIG. 7 compared to six tabs 68, 70 in the washer shown in FIG. 4. In this example, the voids 88 each define about 25% of the circumference of a circle, and about 75% of the total circumference.

Figure 8:
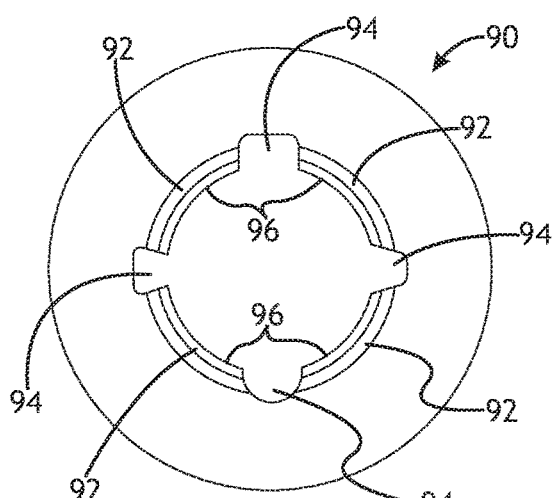
FIG. 8 is a bottom view of a washer.

A washer 90 shown in FIG. 8, for example, includes four tabs 92 that are axially bent and inwardly extending, and four voids 94 located between the tabs (one void between each of the adjacent ends of the tabs). The voids 94 and tabs 92 are of different sizes and shapes. In this example, an inner surface 96 of each tab 92 is between about 15% to 20% of the circumferential length of an imaginary circle and the voids 94 are each between about 5% and 10% of the circumferential length of an imaginary circle. A washer could include tabs and voids of the same or different shapes, as desired, and the difference in size and shape may be of greater or lesser magnitude than what is shown in FIG. 8.

Figure 9:
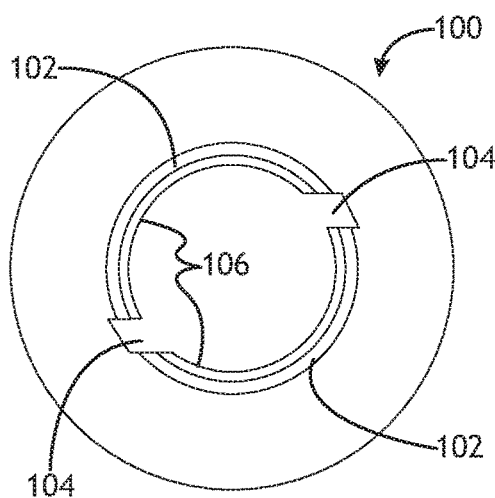
FIG. 9 is a bottom view of a washer.

Somewhat similarly, a washer 100 shown in FIG. 9 has only two tabs 102 and two voids 104. The tabs 102 in this embodiment are much larger (in terms of circumferential or peripheral inner surface length) than the voids 104; an inner surface 106 of each tab 102 is each shown as being about 45% of the circumferential length of the imaginary circle and the voids are about 5% of the circumferential length of the imaginary circle.

The above examples are not limiting. A washer may have an inner most portion defined by the inner surface of at least one tab, and the inner most portion spans between 10% and 90% of circumference of an imaginary circle defined by the inner surface(s). Hence, between 10% and 90% of that imaginary circle is open and defined by one or more voids. In at least some implementations, each void is at least 1 mm in circumferential dimension at the imaginary circle, and each void may be at least 0.5 mm in radial dimension. Further, it is noted that the voids (or edges/surfaces thereof) may not be exactly radially oriented and may have various shapes (several of which are shown in FIGS. 4-9), and that the voids may have a greater or lesser circumferential extent at a location radially outwardly spaced from the imaginary circle. The shape, area and/or radial extent of the voids may be chosen to provide, among other things, a desired fluid flow ability for a given differential.

It is to be understood that the above description is intended to be illustrative and not restrictive. Many embodiments and applications other than the examples provided would be apparent to those of skill in the art upon reading the above description. The scope of the invention should be determined, not with reference to the above description, but instead with reference to the appended claims, along with the full scope of equivalents to which such claims are entitled. It is anticipated and intended that future developments will occur in the arts discussed herein, and that the disclosed assemblies and methods will be incorporated into such future embodiments. In sum, it should be understood that the invention is capable of modification and variation that is limited only by the following claims.

All terms used in the claims are intended to be given their broadest reasonable construction and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

The invention claimed is:

1. A vehicle differential, comprising:
a housing having an interior wall;
a pinion shaft mounted in the housing;
a pinion gear mounted on the pinion shaft;
a first side gear within the housing and engaged with the pinion gear;
a second side gear within the housing and engaged with the pinion gear,
a pinion gear washer received between the interior wall and the pinion gear, the washer having an outer edge at a maximum radial distance from an axis of the washer, an inner edge defining an opening through which the pinion shaft is received, the inner edge defined in part by an innermost portion at a minimum radial distance from the axis and the inner edge having an outward portion spaced radially outwardly from the innermost portion, and an axially and radially inclined sidewall extending at least part of the way between the outer edge and the innermost portion, wherein the pinion gear includes a beveled portion that leads to a central opening through which the pinion shaft is received, and wherein the washer also comprises a rim received adjacent to the beveled portion, and wherein the sidewall extends from a first end at the outer edge to a second sidewall end that is axially spaced from the outer edge and the rim extends from the second sidewall end to the inner edge, and the rim is axially inclined so that the inner edge is axially between the first and second ends of the sidewall.

2. The differential of claim 1 wherein the innermost portion includes one or more segments that each have an inner surface that defines part of the innermost portion.

3. The differential of claim 2 wherein the outward portion is defined by one or more voids, each void being defined between two segments.

4. The differential of claim 1 wherein a peripheral length of the first end is greater than a peripheral length of the second end.

5. The differential of claim 1 wherein a gap exists between part of the sidewall and an outer surface of the pinion gear.

6. The differential of claim 3 wherein the one or more voids comprise between 10% and 90% of the circumference of a circle bounded by the innermost portion, or wherein the innermost portion comprises between 10% and 90% of the circumference of a circle bounded by the innermost portion.

7. The differential of claim 1 wherein the rim is defined by circumferentially spaced and radially inwardly extending tabs.

8. The differential of claim 7 wherein at least one of the tabs is bent axially and a free end of said at least one tab is axially overlapped by the sidewall.

9. The differential of claim 1 wherein the pinion gear is a first pinion gear and the pinion gear washer is a first pinion gear washer, and wherein the differential also comprises a second pinion gear that is mounted on the pinion shaft and engaged with both the first side gear and the second side gear, and a second pinion gear washer provided between the housing and the second pinion gear, the second pinion gear washer being constructed the same as the first pinion gear washer.

10. A differential, comprising:
a housing;
a pinion shaft mounted in the housing;
a pinion gear having an opening in which the pinion shaft is received, and the pinion gear having an outer surface;
a first side gear within the housing and engaged with the pinion gear;
a second side gear within the housing and engaged with the pinion gear,
a pinion gear washer having a contoured sidewall with a first end and a second end, the first end having a first peripheral length relative to an axis of the washer, and the second end being axially offset from the first end and having a second peripheral length relative to the axis that is less than the first peripheral length, the washer having an inner edge defining an opening that is not circular, the inner edge defined in part by an innermost portion at a minimum radial distance from the axis and the inner edge having an outward portion spaced radially outwardly from the innermost portion, the innermost portion being located radially inwardly of the sidewall and axially between the first end and second end of the sidewall, wherein the washer is received between the housing and the pinion gear with at least part of the sidewall overlapping at least part of the outer surface and wherein a gap is provided between the sidewall and the outer surface to permit fluid flow between the sidewall and the outer surface, and wherein the sidewall has a uniform thickness without any voids in the sidewall.

11. The differential of claim 10 wherein the innermost portion includes one or more segments that each have an inner surface that defines part of the innermost portion.

12. The differential of claim 11 wherein the outward portion is defined by one or more voids, each void being defined between two segments.

13. The differential of claim 10 wherein the pinion gear includes a beveled portion adjacent to the opening, and wherein the washer also comprises a rim received adjacent to the beveled portion, and wherein the sidewall extends from a first end at an outer edge to a second sidewall end that is axially spaced from the outer edge and the rim extends from the second sidewall end to the inner edge, and the rim is axially inclined so that the inner edge is axially between the first and second ends of the sidewall.

14. The differential of claim 10 wherein the pinion gear is a first pinion gear and the pinion gear washer is a first pinion gear washer, and wherein the differential also comprises a second pinion gear having an opening in which the pinion shaft is received and an outer surface, and wherein the second pinion gear is engaged with both the first side gear and the second side gear, and wherein the differential also comprises a second pinion gear washer provided between the housing and the second pinion gear, the second pinion gear washer being constructed the same as the first pinion gear washer and the second pinion gear washer has a sidewall that at least partially overlaps at least part of the outer surface of the second pinion gear and wherein a gap is provided between the sidewall of the second pinion gear washer and the outer surface of the second pinion gear to permit fluid flow between the second pinion gear washer and the second pinion gear.

15. The differential of claim 10 wherein the innermost portion comprises between 10% and 90% of the circumference of a circle bounded by the innermost portion.

16. The differential of claim 10 wherein the outward portion includes a surface that is at least 0.5 mm radially outwardly spaced from the innermost portion.

17. The differential of claim 12 wherein each void is at least 1 mm in circumferential dimension at an imaginary circle bounded by the innermost portion.

18. The differential of claim 5 wherein the pinion gear has a central axis and the outer surface of the pinion gear is sloped in the axial direction, and the sidewall is curved along its axial length.

19. The differential of claim 10 wherein the pinion gear has a central axis and the outer surface of the pinion gear is sloped in the axial direction, and the sidewall is curved along its axial length.

* * * * *